US008775571B2

(12) United States Patent
Srinivasan et al.

(10) Patent No.: US 8,775,571 B2
(45) Date of Patent: Jul. 8, 2014

(54) METHODS, SYSTEMS, AND COMPUTER PROGRAM PRODUCTS FOR DYNAMIC NETWORK ACCESS DEVICE PORT AND USER DEVICE CONFIGURATION FOR IMPLEMENTING DEVICE-BASED AND USER-BASED POLICIES

(75) Inventors: Balaji Srinivasan, Fremont, CA (US); Desikan Saravanan, Santa Clara, CA (US); Nick G. Suizo, San Jose, CA (US); Rajasekaran Nagarajan, Newark, CA (US); Jeffrey A. Ronne, Cupertino, CA (US); Abhay Gidwani, Sunnyvale, CA (US); Wolfgang Lochner, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 935 days.

(21) Appl. No.: 11/147,143

(22) Filed: Jun. 7, 2005

(65) Prior Publication Data
US 2006/0274774 A1 Dec. 7, 2006

(51) Int. Cl.
*G06F 15/177* (2006.01)
(52) U.S. Cl.
USPC ............................ 709/220; 370/254; 370/420
(58) Field of Classification Search
USPC ........................................................ 709/220
See application file for complete search history.

(56) References Cited

U.S. PATENT DOCUMENTS

| 5,561,763 | A | 10/1996 | Eto et al. |
| 5,751,967 | A * | 5/1998 | Raab et al. ................... 709/228 |
| 6,070,187 | A | 5/2000 | Subramaniam et al. |
| 6,307,544 | B1 | 10/2001 | Harding |
| 6,456,306 | B1 | 9/2002 | Chin et al. |
| 6,678,248 | B1 | 1/2004 | Haddock et al. |
| 6,816,897 | B2 | 11/2004 | McGuire |
| 6,904,424 | B1 | 6/2005 | Gusler et al. |
| 7,380,025 | B1 | 5/2008 | Riggins et al. |
| 7,411,915 | B1 * | 8/2008 | Spain et al. ................... 370/250 |
| 8,279,874 | B1 | 10/2012 | Lu et al. |
| 2002/0009078 | A1 | 1/2002 | Wilson et al. |
| 2002/0194407 | A1 | 12/2002 | Kim |
| 2003/0217148 | A1 | 11/2003 | Mullen et al. |
| 2003/0225893 | A1 * | 12/2003 | Roese et al. ................. 709/227 |
| 2004/0003600 | A1 | 1/2004 | Hawkins, Jr. et al. |

(Continued)

FOREIGN PATENT DOCUMENTS

WO   WO 01/86906 A2   11/2001

OTHER PUBLICATIONS

Davies, "RADIUS Protocol Security and Best Practices," Microsoft Windows 2000 Server, Microsoft Corporation, pp. I-iv and 1-12 (Jan. 2002).

(Continued)

*Primary Examiner* — John Follansbee
*Assistant Examiner* — Glenford Madamba
(74) *Attorney, Agent, or Firm* — Jenkins, Wilson, Taylor & Hunt, P.A.

(57) ABSTRACT

Methods, systems, and computer program products for dynamic network access device port and user device configuration are disclosed. According to one method, when a user device is connected to a port of a network access device, the type of user device is determined. The type of user device is used to locate a corresponding port configuration policy. The port to which the device is connected is dynamically configured based on the port configuration policy.

38 Claims, 12 Drawing Sheets

(56) References Cited

U.S. PATENT DOCUMENTS

| | | | |
|---|---|---|---|
| 2004/0073600 A1* | 4/2004 | Elo et al. | 709/201 |
| 2004/0133634 A1 | 7/2004 | Luke et al. | |
| 2005/0163118 A1* | 7/2005 | Steindl | 370/389 |
| 2005/0195949 A1* | 9/2005 | Frattura | 379/88.17 |
| 2005/0204176 A1 | 9/2005 | Togawa | |
| 2005/0264420 A1* | 12/2005 | Vogel et al. | 340/572.1 |
| 2005/0273851 A1 | 12/2005 | Raju Datla et al. | |
| 2006/0133383 A1 | 6/2006 | Homer et al. | |
| 2006/0168203 A1 | 7/2006 | Levillain et al. | |
| 2006/0187849 A1* | 8/2006 | Hamedi | 370/252 |
| 2006/0236095 A1 | 10/2006 | Smith et al. | |
| 2007/0038699 A1 | 2/2007 | Oikarinen et al. | |
| 2007/0064624 A1 | 3/2007 | Finn et al. | |
| 2008/0101240 A1 | 5/2008 | Rohilla et al. | |
| 2008/0147455 A1 | 6/2008 | Brunswig et al. | |
| 2008/0219184 A1 | 9/2008 | Fowler et al. | |
| 2008/0240104 A1 | 10/2008 | Villait et al. | |
| 2011/0243133 A9 | 10/2011 | Villait et al. | |

OTHER PUBLICATIONS

Rigney et al., "Remote Authentication Dial in User Service (RADIUS)," Network Working Group, pp. 1-71 (Jun. 2000).
Notification of Transmittal of the International Search Report and the Written Opinion of the International Searching Authority, or the Declaration for International Application No. PCT/US06/22388 (Sep. 13, 2007).
Final Office Action for U.S. Appl. No. 11/772,031 (Jul. 11, 2011).
Advisory Action for U.S. Appl. No. 11/731,135 (May 17, 2011).
Official Action for U.S. Appl. No. 11/772,031 (Mar. 8, 2011).
Final Official Action for U.S. Appl. No. 11/731,135 (Feb. 23, 2011).
Advisory Action for U.S. Appl. No. 11/772,031 (Nov. 10, 2010).
Final Official Action for U.S. Appl. No. 11/772,031 (Aug. 31, 2010).
Official Action for U.S. Appl. No. 11/731,135 (Aug. 30, 2010).
Advisory Action for U.S. Appl. No. 11/731,135 (Jun. 3, 2010).
Official Action for U.S. Appl. No. 11/772,031 (May 6, 2010).
Interview Summary for U.S. Appl. No. 11/772,031 (Mar. 23, 2010).
Final Official Action for U.S. Appl. No. 11/731,135 (Mar. 15, 2010).
Final Official Action for U.S. Appl. No. 11/772,031 (Dec. 21, 2009).
Official Action for U.S. Appl. No. 11/731,135 (Oct. 26, 2009).
Official Action for U.S. Appl. No. 11/722,031 (Jul. 6, 2009).
Commonly-assigned, co-pending U.S. Appl. No. 11/772,031 (Unpublished, filed Jun. 29, 2007).
Notice of Allowance and Fee(s) Due for U.S. Appl. No. 11/772,031 (May 31, 2012).
Non-Final Official Action for U.S. Appl. No. 11/772,031 (Feb. 2, 2012).
Final Office Action for U.S. Appl. No. 11/731,135 (Oct. 7, 2013).
Non-Final Office Action for U.S. Appl. No. 11/731,135 (Mar. 13, 2013).

* cited by examiner

METHODS, SYSTEMS, AND COMPUTER PROGRAM PRODUCTS FOR DYNAMIC NETWORK ACCESS DEVICE PORT AND USER DEVICE CONFIGURATION FOR IMPLEMENTING DEVICE-BASED AND USER-BASED POLICIES

TECHNICAL FIELD

The subject matter described herein relates to network access device port configuration and user device configuration. More particularly, the subject matter described herein includes methods, systems, and computer program products for dynamic network access device port and user device configuration for implementing device-based and user-based policies.

BACKGROUND ART

Network access devices, such as network switches and routers, typically include a plurality of communications ports by which user devices, such as wireless access points (WAPs), IP phones, and personal computers, physically connect to the network. In conventional network access devices, each port must be manually configured by a network administrator for each type of device that is to be connected to each port. For example, if it is desirable to connect a user device, such as an IP phone, to port 1 of a network switch, the port must be configured with the VLAN ID, quality of service, and access control list for the IP phone. In addition, the IP phone must be configured with the call server ID of the call server that the IP phone uses to make and receive calls.

If the IP phone is unplugged from the port and another type of device, such as a wireless access point, is connected to the same port, the administrator must manually log in to the switch, reconfigure the port for access by the wireless access point, log in to the wireless access point, and configure the wireless access point. Requiring such manual configuration and reconfiguration each time a device is connected to a network is undesirable as it unnecessarily increases the time required to connect user devices to networks. In addition, as the number of ports in a network access device increases, the time required to configure the network access device is further increased.

FIG. 1 illustrates conventional network access device and port configuration. Referring to FIG. 1, a network access device 100 includes a plurality of communication ports numbered 1-26 in this example. A network management server 102 allows an administrator 104 to configure network access device 100 and a user device 106 that connects to a port of network access device 100. In the illustrated example, user device 106 is a wireless access point.

In order to configure user device 106 and the port of network access device 100 to which user device 106 is connected, as indicated in step 1, administrator 104 defines port configuration for the port to which user device 106 will be connected. In step 2, network management server 102 downloads the port configuration to network access device 100. In step 3, the user connects user device 106 to the port. Because the port was configured in advance to correspond to the user device type, the port configuration matches the user device type. In step 4, the administrator logs into user device 106 and manually configures user device 106. If a new user device is connected to port 1 of network access device 100, both the user device and the port must be manually reconfigured.

Another problem associated with configuration of network access devices is configuring ports to implement user-based network access policies. Similar to the device-based configuration example described above, when a user logs in to a network via a user device connected to a port associated with a switch, that port must be manually configured in advance to provide appropriate network access to the user. For example, if the user is a guest with limited network access privileges, the port must be preconfigured as a guest port so that the user will not exceed that user's access. One example of a guest access policy is to allow the guest to only access the Internet, rather than a corporate network. If a different user logs in to the same port of the network access device, the administrator must manually reconfigure the port with access parameters for the second user. For example, if the second user has full access privileges, the administrator must manually reconfigure the port to remove the previous restrictions provided by the guest access policy. Requiring such manual port configuration each time a new user logs in to a port of a network access device is undesirable as it unnecessarily increases the labor required to connect users to a network via ports of a network access device. Moreover, due to increased user mobility provided by wireless and other technologies, the labor required to manually connect users to the network is further increased.

Accordingly, in light of these difficulties associated with network access device port and user device configuration, there exists a need for improved methods, systems, and computer program products for dynamic network access device port and user device configuration for implementing device-based and user-based policies.

DISCLOSURE OF THE INVENTION

According to one aspect of the subject matter described herein, a method for dynamic network access device port configuration is provided. The method includes storing at least one mapping between a user device type and a network access device port configuration parameter. When a user device is connected to a port of a network access device, the user device type is determined. A network access device port configuration parameter is extracted from the stored mappings based on the determined user device type. The port is dynamically configured based on the device type. The user device may also be dynamically configured based on stored user device configuration parameters.

According to another aspect of the subject matter described herein, a method for dynamically configuring a network access device port based on user group information is provided. The method may include storing at least one association between a user group and a group-based network access policy. An authentication request may be received from a user connecting to a port of a network access device. A user group is determined based on the authentication request. A group-based network access policy is extracted from the stored policies based on the user group. The user is authenticated and the network access device port is dynamically configured to implement the network access policy corresponding to the user group.

As used herein, the term "network access device" includes a switch, a router, or any other device including physical communication ports by which user devices connect to the network. The term "user device" refers to any device through which a user connects to a network. Examples of user devices include IP phones, personal computers, and wireless access points.

The subject matter described herein can be implemented using computer executable instructions embodied in a computer readable medium. Exemplary computer readable media suitable for implementing the subject matter described herein include chip memory devices, disk memory devices, programmable logic devices, application specific integrated circuits, downloadable electrical signals, or any other devices capable of storing computer executable instructions or logical implementations thereof. In addition, a computer readable medium that implements the subject matter described herein may be distributed across multiple physical devices or network nodes.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
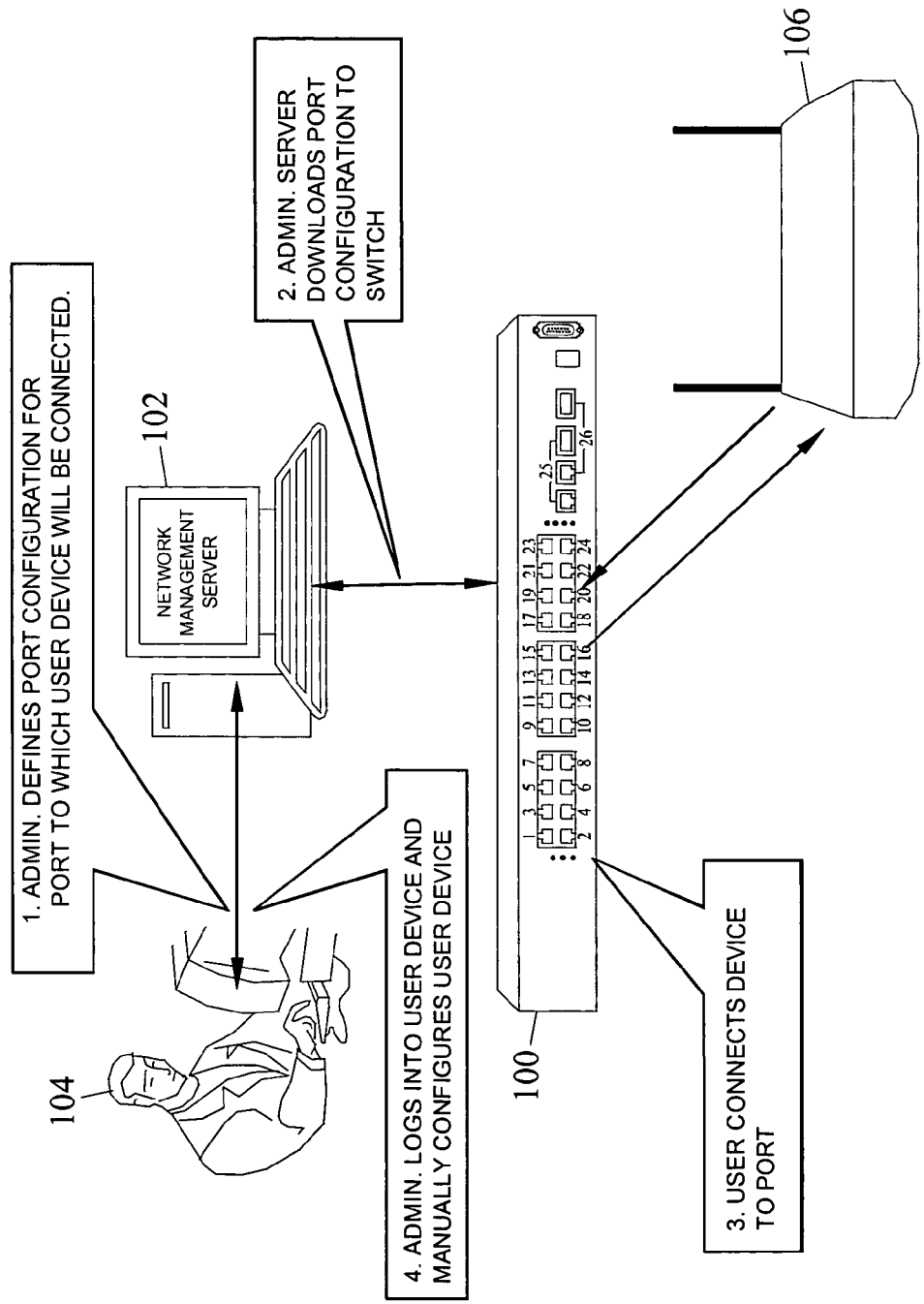
FIG. 1 is a schematic diagram illustrating conventional network access device port configuration.
Figure 2:
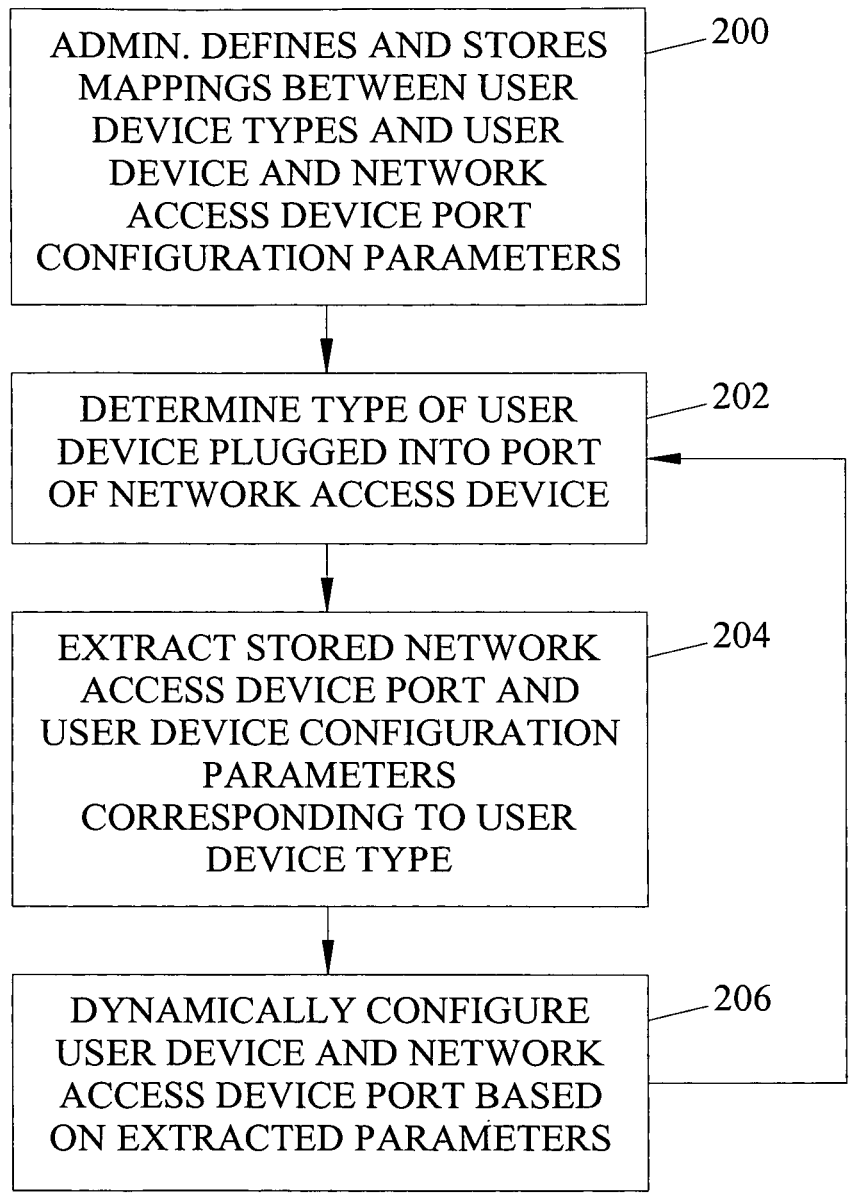
FIG. 2 is a flow chart illustrating exemplary steps for dynamically configuring a network access device port and a user device according to an embodiment of the subject matter described herein.

As described above, methods, systems, and computer program products for dynamic network access device port and user device configuration for implementing device-based and user-based policies are disclosed. FIG. 2 is a flow chart illustrating exemplary steps for dynamically configuring a network access device and a user device according to an embodiment of the subject matter described herein. Referring to FIG. 2, in step 200, an administrator defines and stores mappings between user device types and user device and network access device port configuration parameters corresponding to the user device types. This step may be performed at setup time when an administrator is configuring a network access device, such as a switch or a router. Port and user device configuration parameters may vary based on device type. For example, for an IP phone, the port configuration parameters may include a VLAN ID for the Voice over IP (VoIP) VLAN, quality of service to be given to VoIP packets, an access control list, and a call server ID. For a wireless access point, the device configuration parameters may include security type to be applied, such as 802.1x or WEP, and RADIUS server ID.

The user device and network access device port configuration parameters may be input by an administrator at the command line interface of the network access device or at a network management server separate from the network access device. Configuration commands input by the administrator may include dynamic attributes for which the network access device may substitute user-device-specific values. Exemplary configuration command with dynamic attributes may be:

configure ad ipphone source=$macAddress permit
configure ad ipphone default deny In response to the first command, the network access device may substitute the MAC address of an IP phone connected to one of its ports for the $macAddress parameter so that Ethernet frames sent from the phone will be accepted by the network access device. The second command instructs the network access device to use a default rule of deny for packets on the IP phone port. Thus, these two commands, when implemented together will configure the port to which the IP phone connects to only accept packets that have a source MAC address corresponding to the MAC address of the IP phone.

Using dynamic attributes for which the network access device can substitute user-device-specific attributes facilitates the creation of generic configuration rules that can be created for user device types, rather than specific instances of user device types. For example, ACLs, QoS specifications, and VLANs can be defined for each user device type. When a specific user device connects to the network access device, the network access device will substitute the device-specific parameters for the generic parameters in the port configuration corresponding to the device type.

In step 202, the type of user device plugged into a port of a network access device is determined. This step may be determined by communicating a user device identifier from the user device to the network access device using link layer discovery protocol (LLDP), as described in IEEE standard 802.1ab, the disclosure of which is incorporated herein by reference in its entirety. In an alternate implementation, the device type may be determined based on the medium access control (MAC) address assigned to the device. That is, the network access device or network management server may store a table containing MAC addresses or MAC address prefixes and corresponding user device types. This table may be provisioned by the administrator. When the MAC address of the user device connected to a particular port is detected, that MAC address may be used to look up the user device type in the table.

In step 204, the stored network access device port and user device configuration parameters corresponding to the user device type are extracted. The database that stores the mappings may be located on the network access device or on a network management server separate from the network access device. In step 206, the user device and the network access device port are dynamically configured based on the extracted parameters. Dynamically configuring the user device may include downloading parameters to the user device via exchange of messages, such as LLDP messages, with the user device. For example, if the user device is an IP phone, the call server to which the IP phone should connect may be downloaded to the IP phone using LLDP messages. The network access device port may be configured by downloading port configuration information, such as access control lists, encryption type, and quality of service parameters, to the I/O module in the network access device associated with the port.

It should be noted that after step 206, control returns to step 202, and steps 202-206 are automatically repeated for each new device that is connected to a port of the network access device. However, the step where the administrator defines and stores the mappings between the user device types and the network access device port and user device configuration parameters (step 200) is not required to be repeated. Thus, when a new device is plugged into the same port as a prior device, manual intervention by the administrator is not required. As a result, the subject matter described herein reduces the time for connecting user devices to the network and for configuring a network access device for different user devices.

Figure 3A:
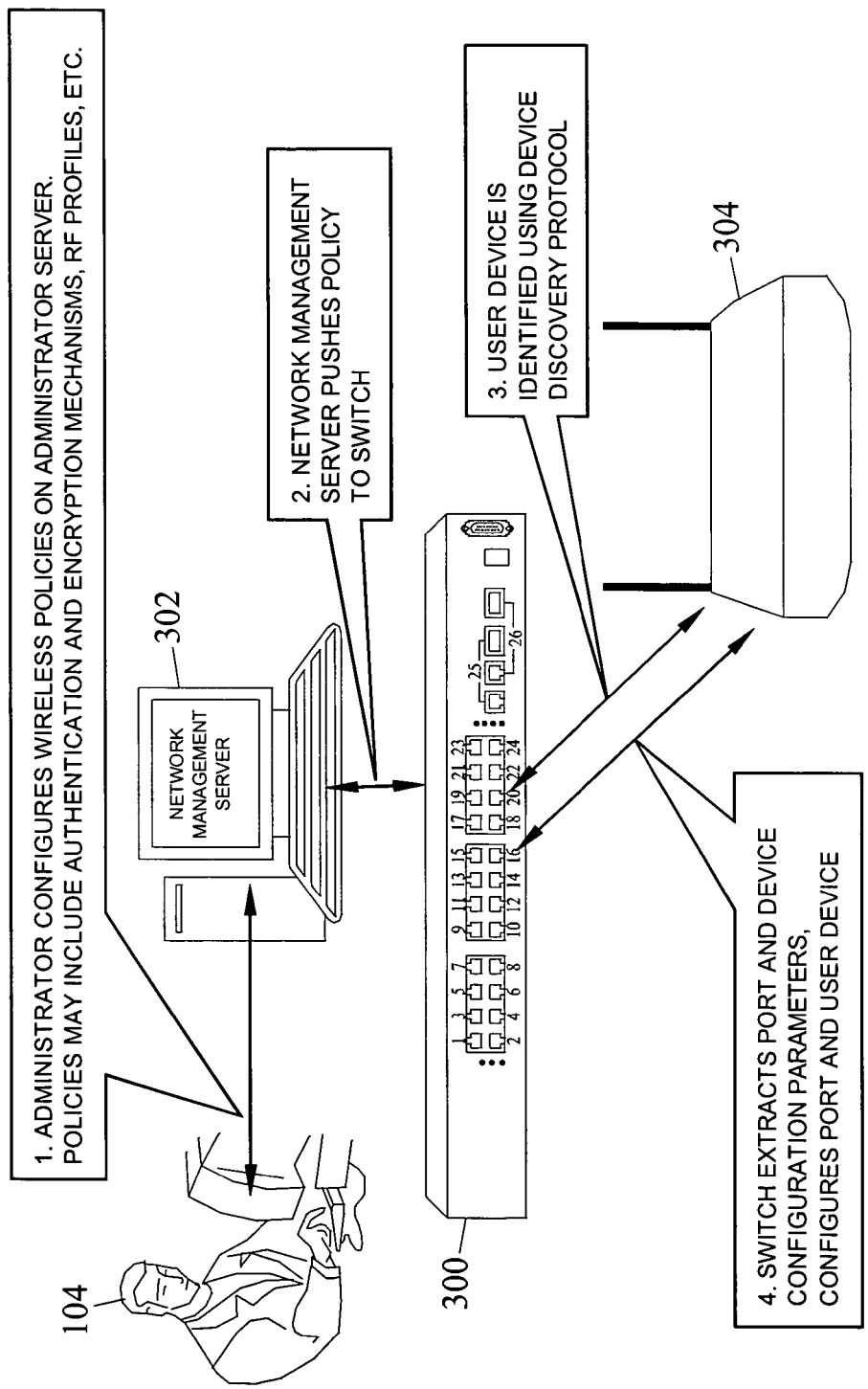
FIG. 3A is a schematic diagram illustrating dynamic configuration of a network access device port and an access point according to an embodiment of the subject matter described herein.

FIG. 3A is a schematic diagram illustrating exemplary components and steps for configuring a network access device and a wireless access point. Referring to FIG. 3A, the network includes network access device 300, which may be any suitable network access device, such as an Ethernet switch or a router. In the illustrated example, network access device 300 includes 26 ports, numbered 1-26. A network management server 302 allows administrator 104 to define network access device port configuration parameters and user device configuration parameters. These parameters may be stored in a table or database having entries or records corresponding to specific device types. In the illustrated example, the user device being configured is a wireless access point 304.

In the process flow illustrated in FIG. 3A, in step 1, administrator 104 configures wireless policies on the administration server. The policies may include authentication and encryption mechanisms, RF parameters, etc. In step 2, network management server 302 pushes the policies to network access device 300. In step 3, access point 304 is identified using a device discovery protocol. As stated above, one exemplary device discovery protocol suitable for use with the subject matter described herein includes LLDP. Conventionally, LLDP has been used to discover device types. According to the subject matter described herein, LLDP or other suitable device discovery protocol may be utilized to download configuration parameters to a user device. In step 4, network access device 300 extracts port and device configuration parameters, configures the port, and configures access point 304.

Figure 3B:
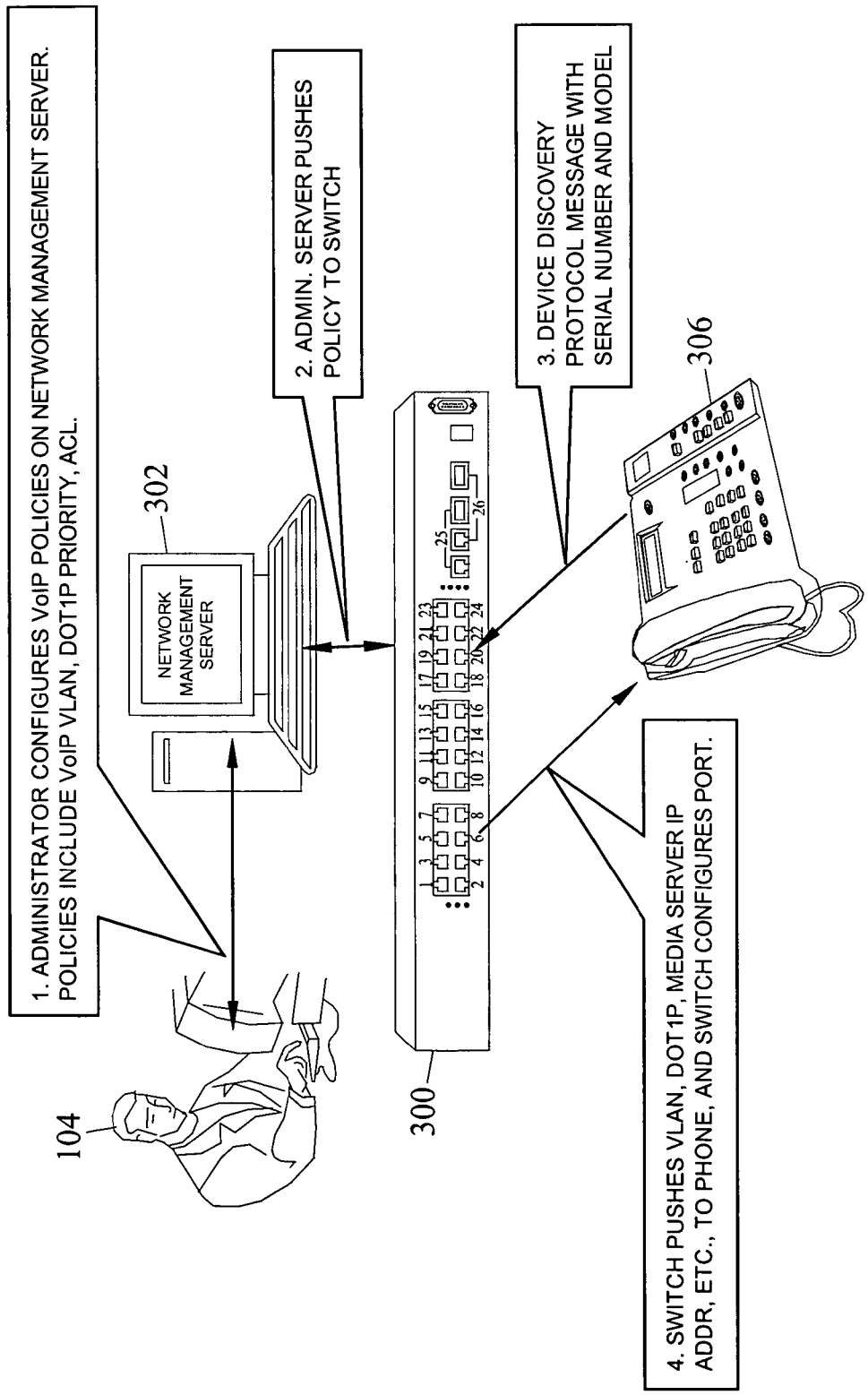
FIG. 3B is a schematic diagram illustrating exemplary configuration of a network access device port and an IP phone according to an embodiment of the subject matter described herein.

FIG. 3B illustrates exemplary steps for automatically configuring an IP phone and a corresponding port of network access device 300 according to an embodiment of the subject matter described herein. Referring to FIG. 3B, an IP phone 306 is assumed to connect to port 1 of network access device 300. In the message flow illustrated in FIG. 3B, administrator 104 configures voice over IP policies. The policies may include VoIP VLAN, the Ethernet frame priority to be given to VoIP packets (referred to as Dot1P priority), access control lists, etc. In step 2, network management server 302 downloads the policies to network access device 300. In step 3, when IP phone 306 is plugged into one of the ports of network access device 300, network access device 300 sends a device discovery protocol message including its serial and model number. In step 4, access device 300 downloads VLAN, Dot1P priority, media server IP address, and other configuration parameters to IP phone 306. Network access device 300 also configures port 1 with the corresponding parameters. Thus, rather than requiring that network access device 300 be manually reconfigured when a new device is connected to the same port as a previous different user device, the steps illustrated in FIG. 3B indicate that such manual reconfiguration is rendered unnecessary by the subject matter described herein.

Figure 3C:
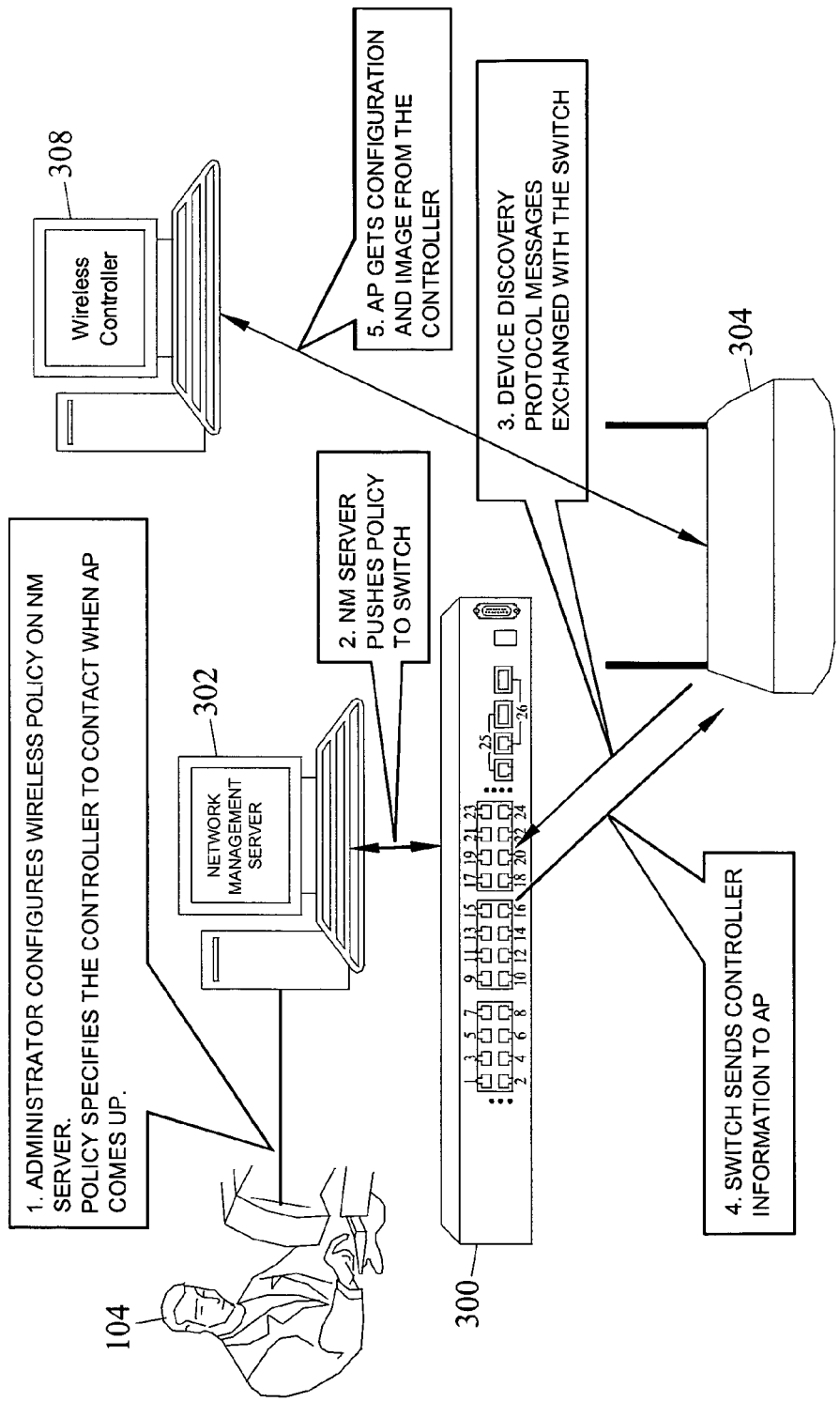
FIG. 3C is a schematic diagram illustrating dynamic configuration of an access point where configuration data is stored separately from a network switch according to an embodiment of the subject matter described herein.

The subject matter described herein is not limited to having network access device 300 download all configuration parameters to the user device. In an alternate implementation, network access device 300 may download contact information for another device from which a user device may receive its configuration information. FIG. 3 is a network diagram illustrating exemplary steps for automatically configuring a user device by informing the user device of the identity and/or location of a controller or server that contains its configuration information. Referring to FIG. 3C, it is assumed that wireless access point 304 is connected to port 1 of user device 300. A wireless controller 308 contains configuration information for wireless access point 304. In step 1, administrator creates a policy for access point 304 and stores the policy on network management server 302. The policy specifies the controller that access point 304 should contact when access point 304 boots up.

In step 3, after wireless access point 304 is connected to a port of network access device 300, wireless access point 304 sends identifying information to network access device 300. The identifying information may include a device type or a MAC address. Network access device 300 determines the user device type and extracts the corresponding configuration information. In this example, the configuration information includes the identity of controller 308. Accordingly, in step 4, network access device 300 sends the controller ID to wireless access point 304. In step 5, access point 304 contacts controller 308 and obtains its configuration image. Thus, the steps in FIG. 3C illustrate that a user device may be dynamically configured using information received from a network access device without requiring that the network access device store all of the configuration information for the user device.

Figure 4:
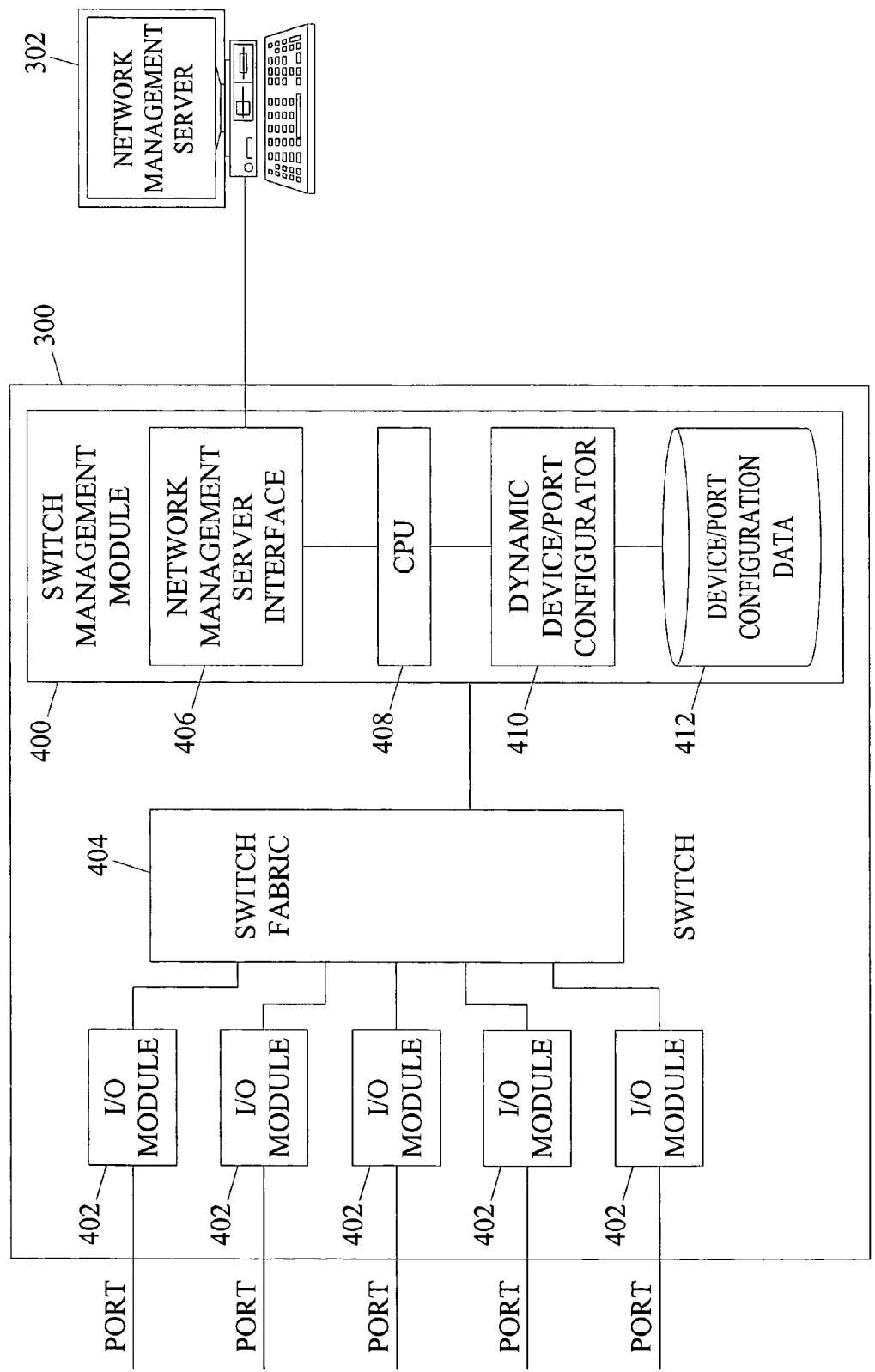
FIG. 4 is a block diagram illustrating an exemplary internal architecture for a network access device including dynamic user device and port configuration capabilities according to an embodiment of the subject matter described herein.

FIG. 4 is a block diagram illustrating an exemplary internal architecture for network access device 300. Referring to FIG. 4, network access device 300 includes a switch management module 400 connected to a plurality of I/O modules 402 via a switch fabric 404. Switch management module 400 includes hardware and software for controlling the operation of network access device 300. In the illustrated example, switch management module 400 includes a network management server interface 406, a CPU 408, a dynamic device/port configurator 410, and device/port configuration database 412. Network management server interface 406 allows an administrator to send configuration data to network access device 300 using network management server 302. CPU 408 controls the operation of user device 300.

According to an aspect of the subject matter described herein, dynamic device/port configurator 410 receives messages from user devices, identifies the device types, and dynamically configures devices and ports using device/port configuration data stored in device/port configuration database 412. For example, when a device connects to one of the ports of network access device 300, a message, such as an LLDP message, may be sent to switch management module 400 via the I/O module corresponding to the port. Dynamic device/port configurator 410 receives the message, determines the device type, and extracts the device and port configuration data from device/port configuration database 412. Device/port configuration database 412 may store network access port and configuration data for a plurality of different user device types, such as IP phones, PCs, access points, soft phones, or other user device types. Dynamic device/port configurator 410 sends the device and port configuration data to the device via the appropriate I/O module. Dynamic device/port configurator 410 also sends port configuration data to the I/O module, and the I/O module stores this data locally.

Figure 5:
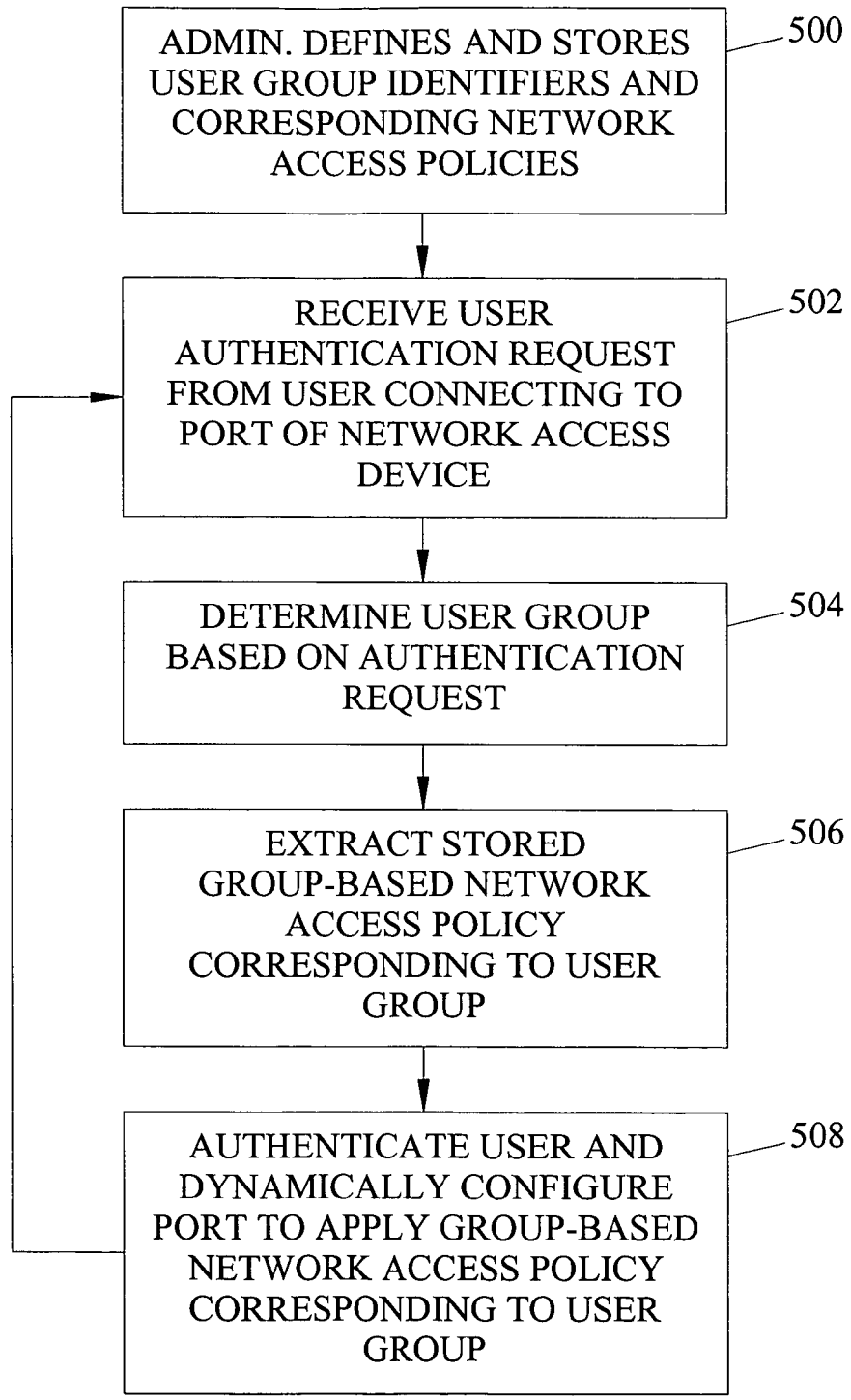
FIG. 5 is a flow chart illustrating exemplary steps for configuring a network access device port for implementing a user-based policy according to an embodiment of the subject matter described herein.

As described above, according to another aspect of the subject matter described herein, ports of a network access device may be dynamically configured with network access policies corresponding to network users. Such dynamic port configuration based on user type may be desirable so that multiple different users can log in or connect to the network via the same port without requiring the administrator to reconfigure the port for each user or user type. FIG. 5 is a flow chart illustrating exemplary steps for dynamically configuring a port of a network access device based on user type. Referring to FIG. 5, in step 500, an administrator defines user groups and corresponding network access policies. In step 502, a network access device receives a user authentication request from a user connecting to a port of a network access device. In step 504, the network access device determines the user group based on the authentication request. In step 506, a group-based network access policy corresponding to the user group is extracted from the stored policies. In step 508, the user is authenticated, and the port to which the user is connected is dynamically configured to apply the group-based network access policy.

It should be noted that after step 508, control returns to step 502 where a new authentication request is received and processed for a different user. Steps 504-508 are repeated for the new user. However, it is not required for the administrator to reconfigure a port each time a new user connects to the same port of network access device 300. In addition, since authentication is based on user groups rather than individual users, the time required for the administrator to define user-based policies is reduced over implementations where policies are user-specific.

Figure 6:
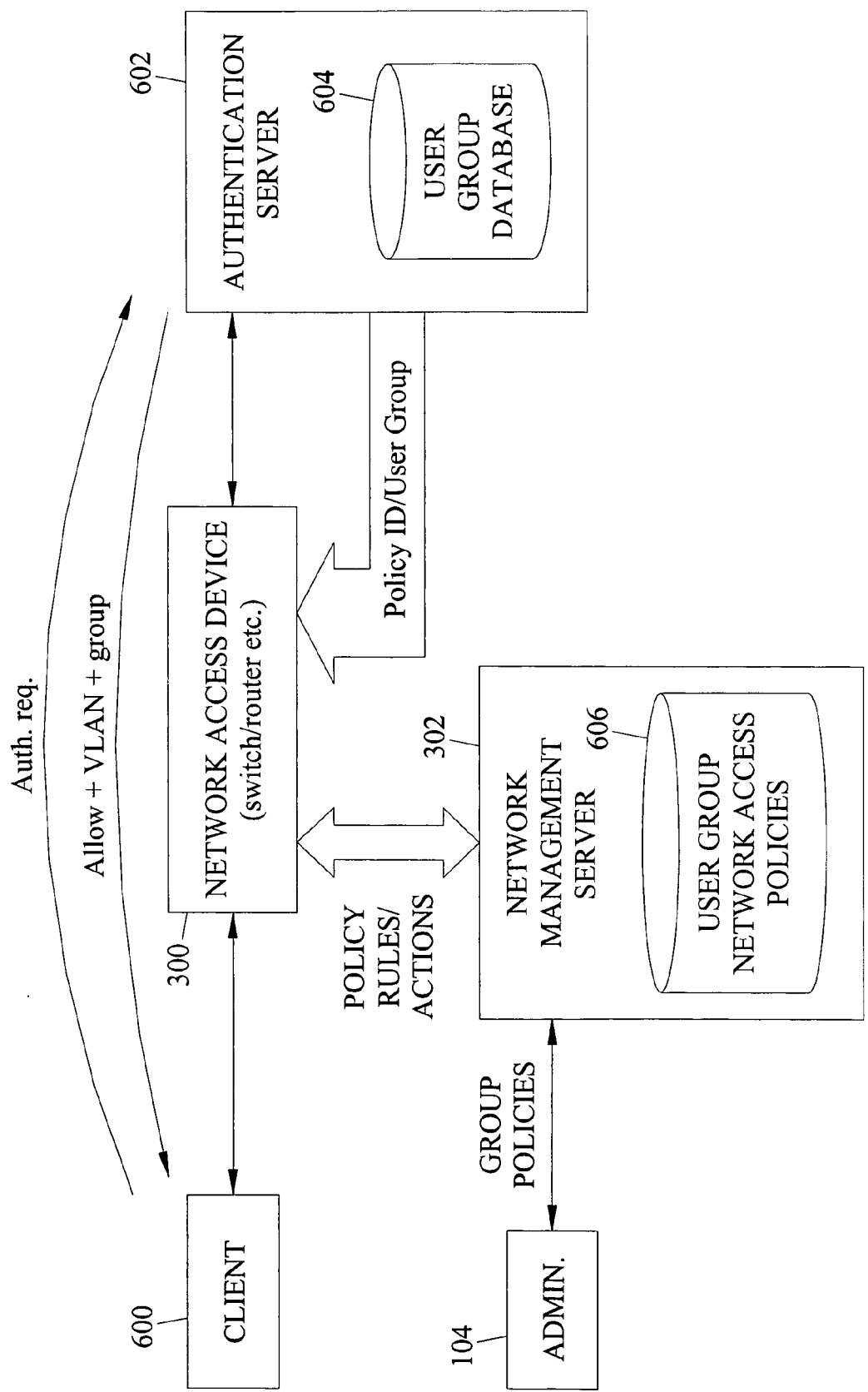
FIG. 6 is a block diagram illustrating exemplary network components and messages for dynamically configuring a network access device port to implement a user-based policy according to an embodiment of the subject matter described herein.

FIG. 6 is a block diagram illustrating exemplary network components for dynamically configuring ports of a network access device to implement group-based network access policies according to an embodiment of the subject matter described herein. Referring to FIG. 6, network access device 300 may be any suitable network access device, as described above. In one implementation, network access device 300 may be a switch or a router. A client 600 may seek to connect to a port of network access device 300. Client 600 may be a user seeking to access the network through a PC, a phone, or other suitable device through which a user may access a network. An authentication server 602 may authenticate users seeking access to the network. Authentication server 602 may any suitable authentication server, such as a RADIUS server. In the illustrated example, authentication server 602 includes a user group database 604 that identifies user groups based on authentication requests from users. In an alternate implementation, rather than having authentication server 602 supply the user group information, a DHCP server may be used to provide the user group information, as well as a dynamically assigned IP address.

Network management server 302 stores group-based network access policies in user group network access policy database 606. More particularly, an administrator defines group-based network access policies for different user groups. Examples of group-based network access policies may include access control lists, access restrictions, quality of service, or other parameters to be given to a specific user group. These policies are stored in database 606.

When a user seeks to access a network, client 600 sends an authentication request message to authentication server 602. Authentication server 602 identifies the user group from the authentication request message and communicates the user group to network access device 300. Network management server 302 may download a user-based policy to network access device 300. The policy is implemented at the port where the user accesses network access device 300. Authentication server 602 may send an authentication response message that grants the user access the network. The authentication response message may include parameters that allow the user to access the network, such as the user VLAN and user group ID.

Figure 7A:
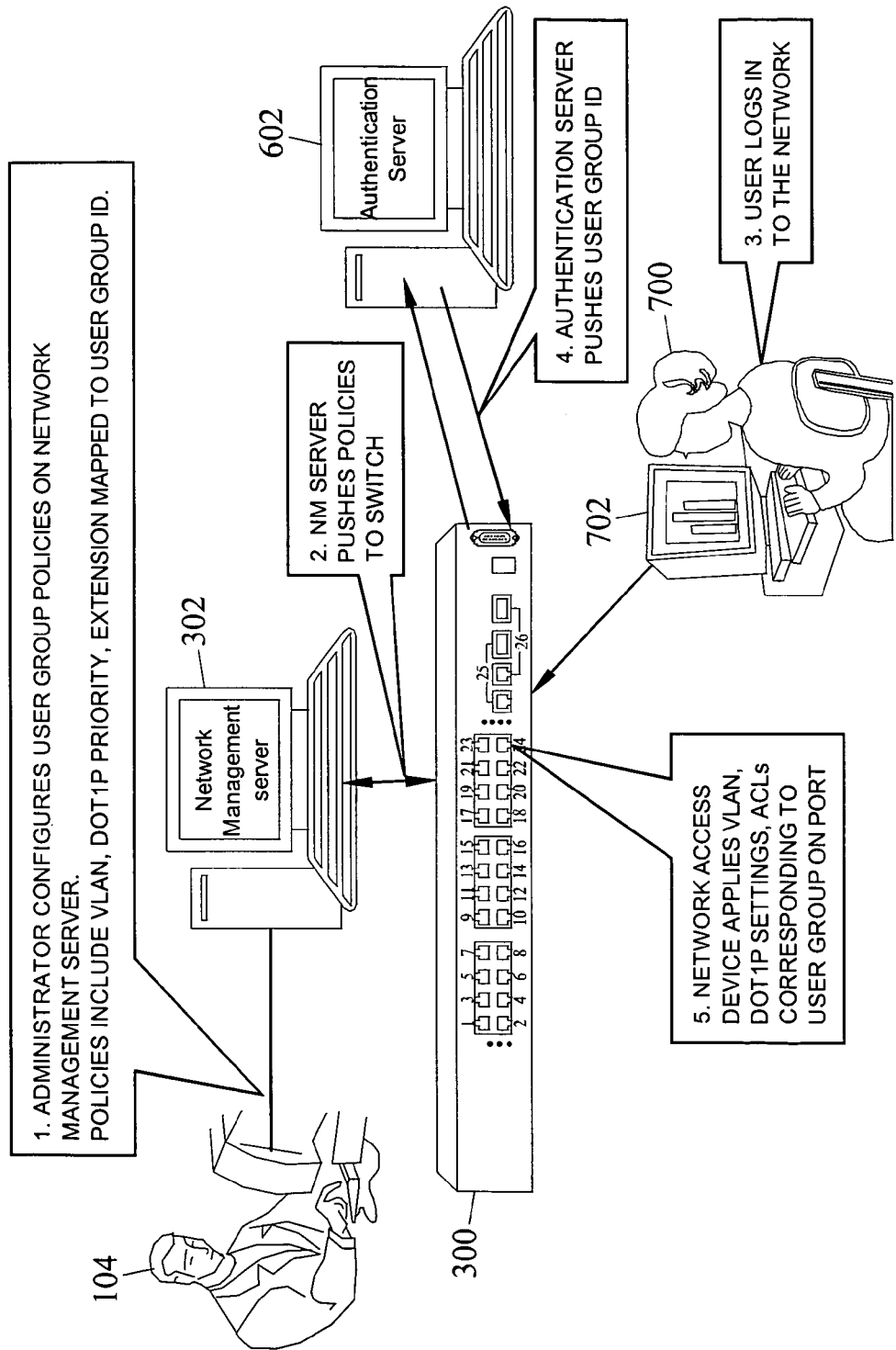
FIG. 7A is a schematic diagram illustrating dynamic configuration of a network access device port to implement a user-based policy for a PC user according to an embodiment of the subject matter described herein.

FIG. 7A illustrates exemplary dynamic creation of network access policies at a port on a network access device when the user logs in through a personal computer. Referring to FIG. 7A, a user 700 attempts to access a network using a personal computer (PC) 702. PC 702 is assumed to be connected to one of the ports of network access device 300.

Referring to the message flow illustrated in FIG. 7A, in step 1, the administrator configures user group policies. Each policy may include the user VLAN, Dot1P priority, and network access restrictions corresponding to the user group. One example of a network access restriction that may be included in a policy is a time-based restriction that allows or prohibits user groups from accessing the network during administrator-specified time periods. These policies may be stored on network management server 302. In step 2, the policies are downloaded to network access device 300. In an alternate implementation, the policies may be entered directly in network access device 300 by administrator 104. In step 3, the user logs in to the network. The result of the user logging in to the network is that an authentication request is sent to authentication server 602. In step 4, authentication server 602 transmits the user group ID to network access device 300. In step 5, network access device 300 extracts the policy corresponding to the user group and applies the network access policies on the port to which PC 702 is connected.

Figure 7B:
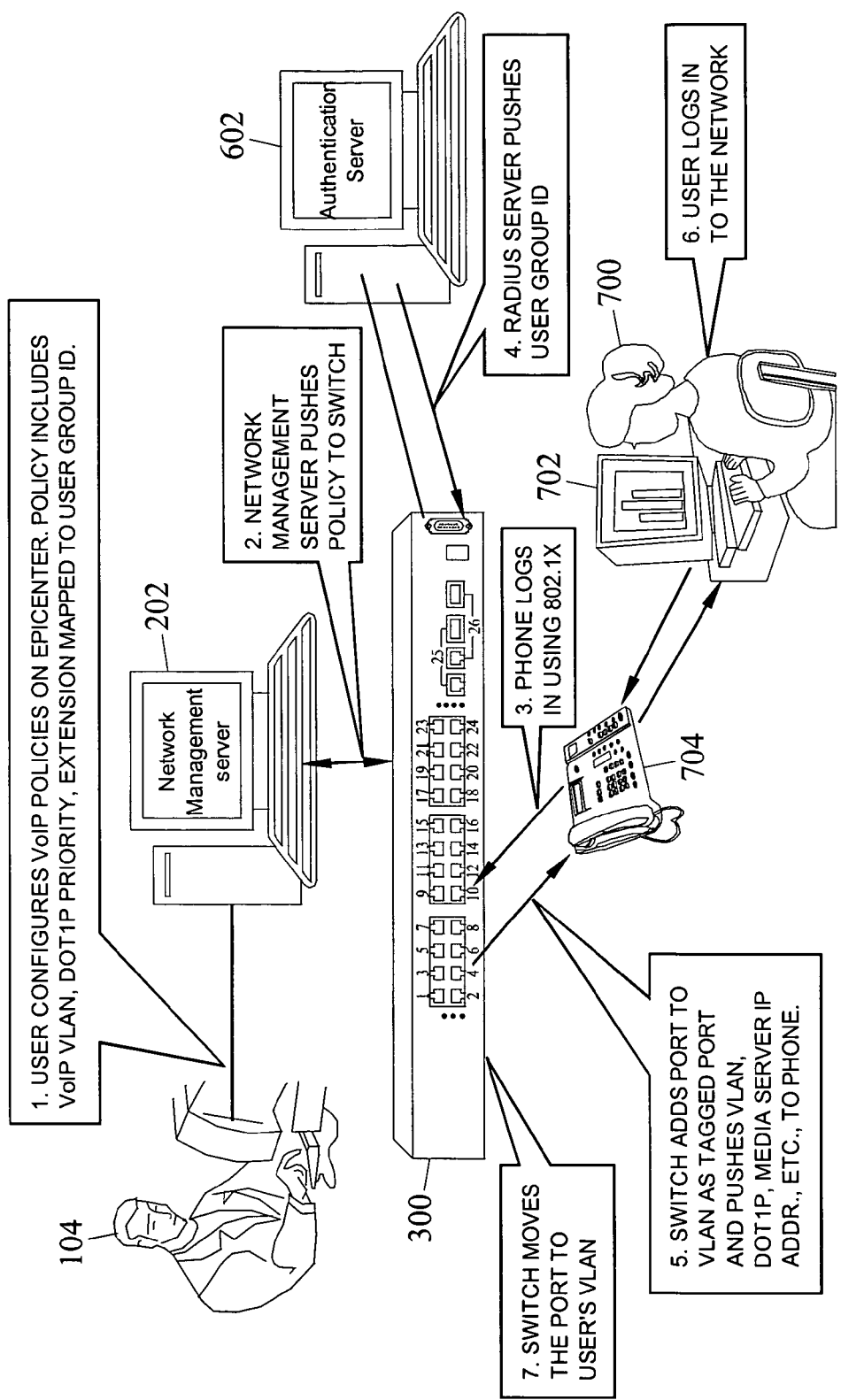
FIG. 7B is a schematic diagram illustrating dynamic configuration of a network access device port to which a PC and an IP phone are simultaneously connected according to an embodiment of the subject matter described herein.

Although in the examples described above with regard to FIGS. 5, 6, and 7A, user-based network policy implementation is triggered by an authentication request from a user, the subject matter described herein is not limited to triggering application of a user-based network access policy based on an authentication request from a user. In an alternate implementation, user-based policy implementation may be triggered at will by network management server 302, by command line interface configuration on network access device 300, or in response to network access device 300 receiving a user group identifier from authentication server 602. FIG. 7B illustrates an example in which a port on network access device 300 is configured for a user-based policy in response to receiving a user group ID from authentication server 602. Referring to FIG. 7B, in step 1, administrator 104 configures network access policies on network management server 302. In FIG. 7B, a PC 702 and an IP phone 704 are assumed to connect to the same port of network access device 300. Accordingly, the policies configured by administrator 104 may include device-based policies, as described above, and user-based policies.

In step 2, network management server 302 pushes the policies to the switch. In step 3, IP phone 704 logs in to the network using an authentication protocol, such as 802.1x. In step 4, authentication server 602 pushes a user group ID to network access device 300. This event may trigger network access device 300 to configure one or more of its ports for access corresponding to the device type and user group ID. In step 5, network access device 300 configures the port for device-based network access parameters and sends configuration information to IP phone 704. The configuration information may include the user VLAN, Dot1P priority, media server IP address, etc.

In step 6, user 700 logs in to the network. In step 7, network access device 300 associates the port to which user 700 connects with the user's VLAN. Thus, FIG. 7B illustrates an example in which a port is configured to implement a user-based policy in response to an event other than an authentication request.

Figure 7C:
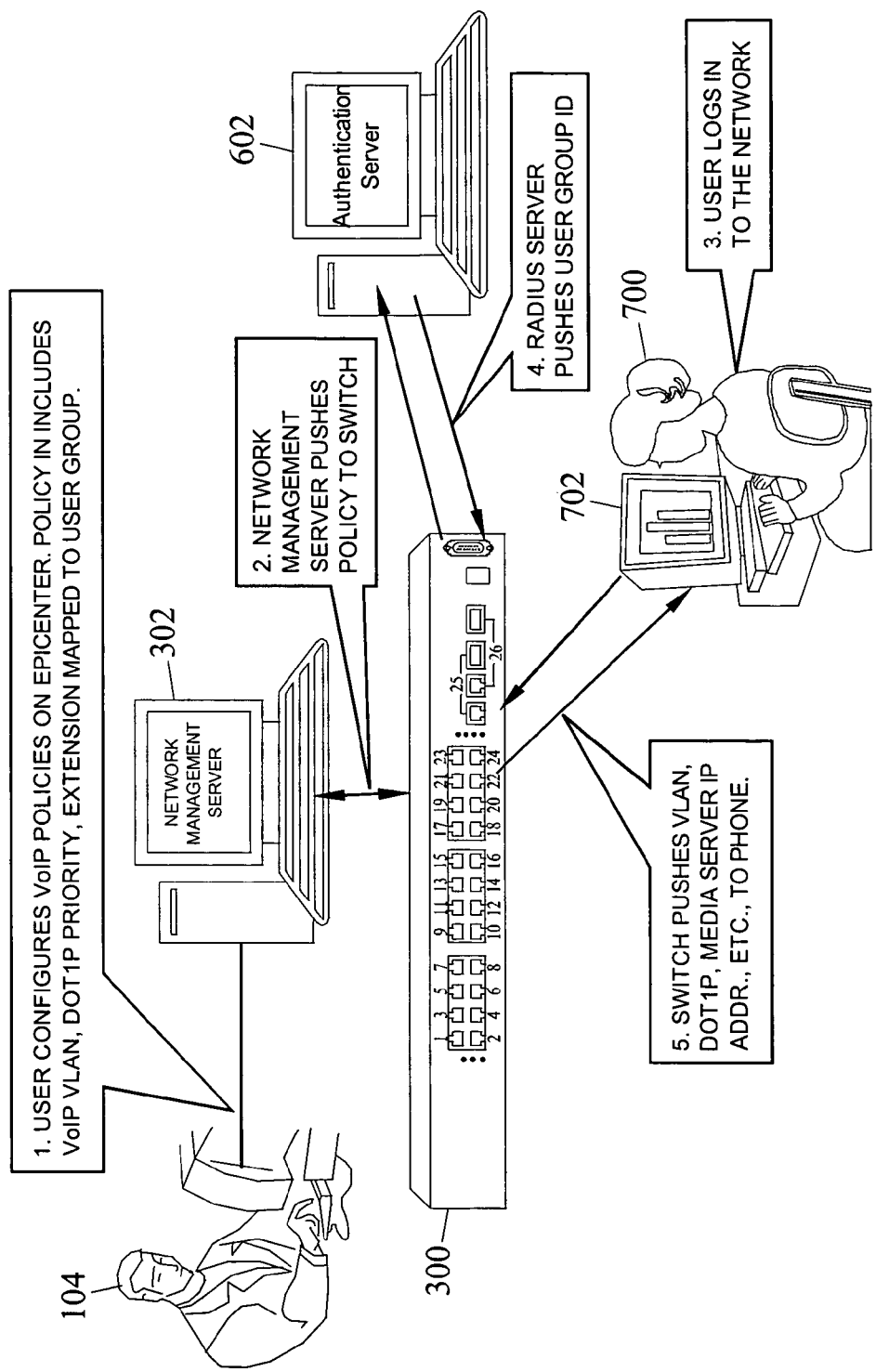
FIG. 7C is a schematic diagram illustrating dynamic configuration of a network access device port to implement a user-based policy for a PC and soft phone user according to an embodiment of the subject matter described herein.

FIG. 7C illustrates another dynamic port configuration example in which a user seeks to log in to the network via a personal computer that includes soft phone capabilities. As used herein, the term "soft phone" refers to telephony client software that may execute on a PC without separate telephone hardware. Referring to FIG. 7C, user 700 seeks to connect to network access device 300 via PC 702. PC 702 is assumed to have both traditional data network access software, and soft phone software.

In the process flow illustrated in FIG. 7C, in step 1, administrator 104 creates voice over IP policies and stores the policies on network management server 302. The policies may include voice over IP VLAN, Dot1P priority, and extension. These policies may be associated with a user group. In step 2, network management server 302 pushes the policies to network access device 300.

In step 3, the user logs in to the network using PC 702. In step 4, network access device 300 sends the authentication request to authentication server 602, and authentication server 602 transmits the user group ID to network access device 300. Network access device 300 determines the port configuration parameters for both the soft phone and data network access capabilities of PC 702. Thus, FIG. 7C illustrates that user policies for different types of network access can be dynamically configured for the same port.

Figure 8:
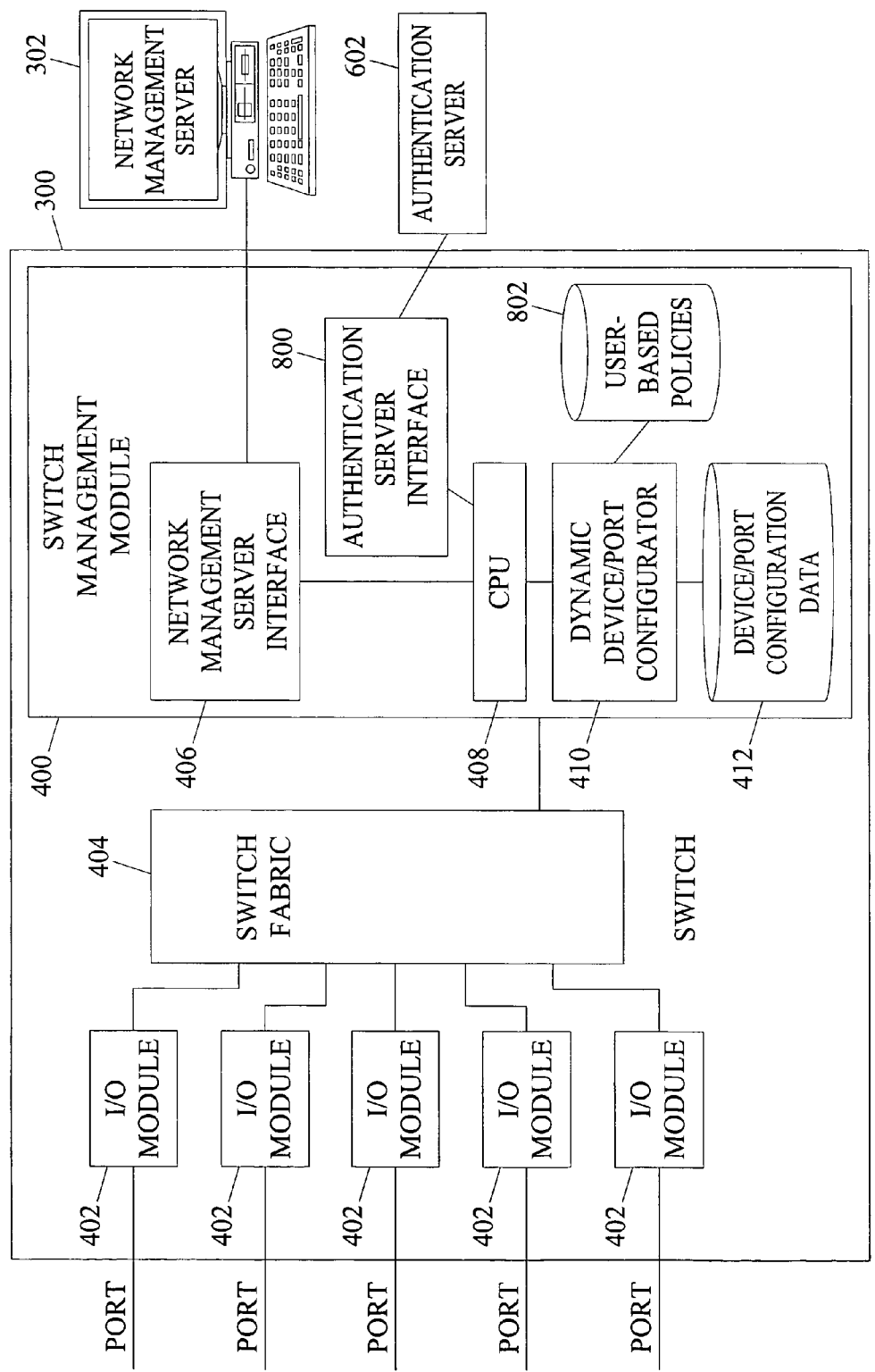
FIG. 8 is a block diagram illustrating exemplary components of a network access device for dynamically configuring a port to implement a user-based policy according to an embodiment of the subject matter described herein.

FIG. 8 is a block diagram illustrating an exemplary internal architecture for networks that access device 300 that includes dynamic configuration of ports to implement user-based network access policies. The block diagram illustrated in FIG. 8 is similar to that illustrated in FIG. 4. Hence, a description of the previously described components will not be repeated. In FIG. 8, switch management module 400 includes an authentication server interface 800 for receiving user group information from authentication server 602. In addition, switch management module 400 includes user-based network policies stored in user-based policy database 802 that may be accessible by dynamic device/port configurator 410. User-based policy database 802 may store user group identifiers and corresponding network access device port configuration parameters. Examples of user group identifiers that may be stored in database 802 may include administrator-defined names for user groups, MAC address ranges for user groups, or VLANs for user groups. Examples of corresponding group-based network access policies include time-based access restrictions, VLAN-based access restrictions, MAC-address-based access restrictions, or IP-address-based access restrictions.

In operation, when the administrator creates a user-based network access policy, the policy is communicated to switch management module 400 via network management server interface 406 and stored in user-based policy database 802. When a user seeks to access the network, the authentication request message may be sent to switch management module 400 via the I/O module 402 corresponding to the port through which the user connects. Switch management module 400 may forward the authentication request message to authentication server 602 via authentication server interface 800. The authentication response from authentication server 602 may be communicated back to the user via the I/O module to which the user is connected.

Switch management module 400 may also receive user group information from authentication server 602. Dynamic device/port configurator 410 may use the user group information to extract one of the user-based network access policies from database 802. Dynamic device/port configurator 410 may configure the I/O module to provide the appropriate user-based network access policies, as described above.

Although in the examples illustrated in FIGS. 3A-3C and 7A-7C, authentication server 602 and network management server 302 are located external to network access device 300, the subject matter described herein is not limited to such an implementation. In an alternate implementation, network management server 302 and/or authentication server 602 may be implemented within network access device 300. For example, network management server 302 and/or authentication server 602 can be components of switch management module 400.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for dynamic network access device port configuration, the method comprising:
   (a) storing, at a network switch, at least one mapping between a user device type and at least one port configuration command corresponding to the user device type and at least one user device configuration parameter corresponding to the user device type, wherein the port configuration command includes a dynamic attribute;
   (b) determining, by the network switch, a device type of a user device plugged into a port of the network switch, wherein determining a user device type includes determining the user device type in response to the user device being connected to the port and exchanging messages with the user device over the port, and wherein exchanging messages with the user device includes exchanging discovery protocol messages with the user device;
   (c) extracting, from storage of the network switch, the port configuration command corresponding to the user device type;
   (d) dynamically configuring, by the network switch, the port using the configuration command, wherein dynamically configuring the port includes substituting a parameter of the user device for the dynamic attribute so that the port configuration command becomes specific to the user device and executing the user-device-specific port configuration command, wherein dynamically configuring the port includes configuring the port to implement a quality of service parameter and at least one of an access control list and a VLAN corresponding to the user device type; and (e) extracting, from the at least one stored mapping at the network switch, a user device configuration parameter corresponding to the user device type and communicating the user device configuration parameter to the user device, wherein communicating the user device configuration parameter to the user device includes downloading the parameter to the user device using a link layer discovery protocol (LLDP) message and using the parameter in configuring the user device.

2. The method of claim 1 wherein storing at least one mapping includes storing a plurality of different mappings between a plurality of different user device types and corresponding port configurations.

3. The method of claim 2 wherein storing a plurality of different mappings for a plurality of different device types includes storing mappings for at least one of an IP phone, a wireless access point, a personal computer, and a soft phone and corresponding port configuration information.

4. The method of claim 1 wherein determining a user device type includes determining the user device type based on a medium access control (MAC) address of the user device.

5. The method of claim 1 wherein determining a user device type includes determining the user device type based on an identifier assigned to the user device type.

6. The method of claim 1 wherein the port configuration command implements a generic port configuration rule corresponding to the user device type.

7. The method of claim 1 comprising detecting a new device being plugged into the port and repeating steps (b)-(d) for automatically configuring the port to function with the new device.

8. The method of claim 7 wherein repeating steps (b)-(d) includes repeating steps (b)-(d) without requiring intervention from an administrator.

9. The method of claim 1 wherein communicating the user device configuration parameter to the user device includes communicating the user device communication parameter to the user device in response to the user device being connected to the port.

10. The method of claim 9 wherein communicating the user device communication parameter to the user device includes downloading the user device configuration parameter from the network switch to the user device via the port.

11. The method of claim 1 wherein the network switch comprises an Ethernet switch.

12. A method for dynamically configuring a port of a network access device based on user group information, the method comprising:

(a) storing, at a network switch, at least one association between a user group and a group-based network access policy and a mapping between the user device type and a user device configuration parameter;

(b) detecting a user connecting a user device to a port of the network switch;

(c) determining, by the network switch, a user group to which the user belongs, wherein determining a user group includes determining the user group in response to the user device being connected to the port and exchanging messages with the user device over the port, and wherein exchanging messages with the user device includes receiving an authentication request from the user device;

(d) extracting, from the at least one association stored at the network switch, a port configuration command that implements a user-based network access policy corresponding to the user group, the port configuration command including a dynamic attribute;

(e) dynamically configuring, by the network switch, the port to implement the user-based network access policy, wherein dynamically configuring the port includes substituting a parameter of the user device for the dynamic attribute so that the port configuration command becomes specific to the user device and executing the user-device-specific port configuration command, wherein dynamically configuring the port includes configuring the port to implement a quality of service parameter and at least one of an access control list and a VLAN corresponding to the user device type; and (f) extracting, from the at least one stored mapping at the network switch, the user device configuration parameter corresponding to the user device type and communicating the user device configuration parameter to the user device, wherein communicating the user device configuration parameter to the user device includes downloading the parameter to the user device using a link layer discovery protocol (LLDP) message and using the parameter in configuring the user device.

13. The method of claim 12 wherein detecting a user connecting to a port of a network access device includes receiving an authentication request from a user connecting to the network access device via the user device.

14. The method of claim 13 wherein the user device selected from a group consisting of: a personal computer, an IP phone, and a soft phone.

15. The system of claim 13 wherein determining a user group includes performing a lookup in a user group database based on information extracted from the authentication request.

16. The method of claim 12 wherein dynamically configuring the port to implement the user-based network access policy includes dynamically configuring the port to implement at least one of a VLAN-based access restriction, a MAC-address-based access restriction, and an IP-address-based access restriction.

17. The method of claim 12 wherein dynamically configuring the port to implement the user-based network access policy includes dynamically configuring the port to implement a time-based network access restriction.

18. The method of claim 12 wherein dynamically configuring the port to implement a user-based network access policy includes dynamically configuring the port in response to receiving a user group identifier from an authentication server.

19. The method of claim 12 comprising detecting a new network user connecting to the port of the network switch and repeating steps (c)-(e) for the new user.

20. The method of claim 19 wherein repeating steps (c)-(e) includes repeating steps (c)-(e) without intervention from a network administrator.

21. The method of claim 12 wherein the network switch comprises an Ethernet switch.

22. A system for dynamic network access device port configuration, the system comprising:

a network switch device including:

at least one port configured to provide physical access to a network;

a device and port configuration database configured to store port and user device configuration data, the device and port configuration database configured to store at least one port configuration command including a dynamic attribute;

a dynamic device/port configurator configured to determine a type of a user device connected to the at least one port, wherein determining a user device type includes determining the user device type in response to the user device being connected to the port and exchanging messages with the user device over the port, and wherein exchanging messages with the user device includes exchanging discovery protocol messages with the user device, the dynamic device/port configurator for dynamically configuring the at least one port based on the user device type using the at least one port configuration command, which corresponds to the user device type stored in the database and for communicating, to the user device, a user device configuration parameter corresponding to the user device type using at least one user device configuration parameter corresponding to the user device type stored in the database, wherein communicating the user device configuration parameter to the user device includes downloading the parameter to the user device using a link layer discovery protocol (LLDP) message and using the parameter in configuring the user device, wherein dynamically configuring the port includes substituting a parameter of the user device for the dynamic attribute so that the port configuration command becomes specific to the user device and executing the user-device-specific port configuration command, wherein dynamically configuring the port includes configuring the port to implement a quality of service parameter and at least one of an access control list and a VLAN corresponding to the user device type.

23. The system of claim 22 wherein the dynamic device/port configurator is adapted to store mappings between a plurality of different device types and corresponding network access device port configuration data.

24. The system of claim 23 wherein the plurality of different device types includes at least one of IP phones, wireless access points, personal computers, and soft phones.

25. The system of claim 22 wherein the dynamic device/port configurator is adapted to determine the user device type based on a medium access control (MAC) address of the user device.

26. The system of claim 22 wherein the dynamic device/port configurator is adapted to determine the user device type based on an identifier assigned to the user device.

27. The system of claim 22 wherein the dynamic device/port configurator is adapted to dynamically reconfigure the port in response to detecting a new user device being connected to the port.

28. The system of claim 22 wherein the dynamic device/port configurator is adapted to communicate the user device configuration parameter to the user device in response to the user device being connected to the port.

29. The system of claim 22 wherein the dynamic device/port configurator is adapted to detect a user connecting to the port device via the user device and to dynamically configure the port to implement a first user-based network access policy for the user.

30. The system of claim 29 wherein the first user-based network access policy includes at least one of a MAC-address-based, a VLAN-based, and an IP-address-based network access restriction.

31. The system of claim 29 wherein the first user-based network access policy includes a time-based network access restriction.

32. The system of claim 29 wherein the dynamic device/port configurator is adapted to select the first user-based network access policy based on a user group to which the user belongs.

33. The system of claim 29 comprising, in response to detecting a new user connecting to the port, the dynamic device/port configurator is adapted to dynamically configure the port to implement a second user-based network access policy different from the first user-based network access policy.

34. The system of claim 29 wherein the dynamic device/port configurator is adapted to implement the first user-based network access policy in response to an authentication request from the user.

35. The system of claim 29 wherein the dynamic device/port configurator is adapted to implement the first user-based network access policy in response to receiving a user group ID from a server.

36. The system of claim 22 wherein the port comprises a port of an Ethernet switch.

37. A non-transitory computer readable medium having stored thereon computer executable instructions that when executed by a processor of a computer perform steps comprising:
(a) storing, at a network switch, at least one mapping between a user device type and: at least one port configuration command corresponding to the user device type and at least one user device configuration parameter corresponding to the user device type, the port configuration command including a dynamic attribute;
(b) determining, by the network switch, a device type of a user device plugged into a port of the network switch, wherein determining a user device type includes determining the user device type in response to the user device being connected to the port and exchanging messages with the user device over the port, and wherein exchanging messages with the user device includes exchanging discovery protocol messages with the user device;
(c) extracting, from storage of the network switch, the port configuration command corresponding to the device type;
(d) dynamically configuring, by the network switch, the port using the configuration, wherein dynamically configuring the port includes substituting a parameter of the user device for the dynamic attribute so that the port configuration command becomes specific to the user device and executing the user-device-specific port configuration command, wherein dynamically configuring the port includes configuring the port to implement a quality of service parameter and at least one of an access control list and a VLAN corresponding to the user device type; and
(e) extracting, by the network switch, a user device configuration parameter corresponding to the user device type from the at least one stored mapping at the network switch and communicating the user device configuration parameter to the user device, wherein communicating the user device configuration parameter to the user device includes downloading the parameter to the user device using a link layer discovery protocol (LLDP) message and using the parameter in configuring the user device.

38. A non-transitory computer readable medium having stored thereon computer executable instructions that when executed by a processor of a computer perform steps comprising:

(a) storing, at a network switch, at least one association between a user group and a group-based network access policy and a mapping between a user device type and a user device configuration parameter;

(b) detecting, by the network switch, a user connecting a user device to a port of the network switch;

(c) determining, by the network switch, a user group to which the user belongs, wherein determining a user group includes determining the user group in response to the user device being connected to the port and exchanging messages with the user device over the port, and wherein exchanging messages with the user device includes receiving an authentication request from the user device;

(d) extracting, from the at least an association stored at the network switch, a port configuration command that implements a user-based network access policy corresponding to the user group, the port configuration command including a dynamic attribute;

(e) dynamically configuring, by the network switch, the port to implement the user-based network access policy, wherein dynamically configuring the port includes substituting a parameter of the user device for the dynamic attribute so that the port configuration command becomes specific to the user device and executing the user-device-specific port configuration command, wherein dynamically configuring the port includes configuring the port to implement a quality of service parameter and at least one of an access control list and a VLAN corresponding to the user device type; and (f) extracting, by the network switch, a user device configuration parameter corresponding to the user device type from the stored mapping at the network switch and communicating the user device configuration parameter to the user device, wherein communicating the user device configuration parameter to the user device includes downloading the parameter to the user device using a link layer discovery protocol (LLDP) message and using the parameter in configuring the user device.

* * * * *